Dec. 4, 1934.   F. E. WOLCOTT   1,983,209
ELECTRIC COFFEE MAKER
Filed Nov. 25, 1930   2 Sheets-Sheet 1

INVENTOR
FRANK E. WOLCOTT
BY
ATTORNEY.

Dec. 4, 1934.  F. E. WOLCOTT  1,983,209
ELECTRIC COFFEE MAKER
Filed Nov. 25, 1930  2 Sheets—Sheet 2

INVENTOR
FRANK E. WOLCOTT
BY
ATTORNEY.

Patented Dec. 4, 1934

1,983,209

UNITED STATES PATENT OFFICE 1,983,209

ELECTRIC COFFEE MAKER

Frank E. Wolcott, West Hartford, Conn., assignor to The Silex Company, a corporation of Connecticut Application November 25, 1930, Serial No. 498,053

28 Claims. (Cl. 219—43)

My invention relates to electric coffee makers. It has among its objects to provide an improved electric coffee maker, and more particularly, such a coffee maker of the vacuum type, and one especially adapted to use in restaurants or the like, although not limited to such service. A further object of my invention is to provide an improved coffee maker having improved coffee maker supporting and heating means disposed in an improved compact relation and also having improved heating means and improved means whereby despite the use of heating means of high capacity and the more compact construction mentioned, it is made possible to continue to effect automatic limitation of the infusion to a normal infusion period while the coffee maker remains in operative relation to the supporting and heating means for the lower bowl thereof. Another object of my invention is to provide an improved electric stove especially adapted to use in such coffee makers and of high efficiency and wherein the heat developed by the heating unit is effectively utilized and directed upon the lower bowl of the coffee maker with a minimum of heat loss. A still further object of my invention is to provide such an improved stove especially adapted to use in such coffee makers and having an improved structure and arrangement of support, article supporting means, and heating unit and also having improved heat reflecting and circulation providing means whereby the above results are obtained. Another object of my invention is to provide an improved heating device especially adapted to heat a glass container, such, for example, as the lower bowl of a vacuum type coffee maker, while providing a minimum of engagement of metal and glass and minimizing wastage of heat through the bowl supporting means and the stand, and cooperating with the coffee maker to produce a structure which is not only adapted to come quickly up to heat, but is further adapted to be very quickly cooled in such manner as to expedite the coffee making operation while permitting the coffee maker to remain upon the stove thereof after the heat has been turned off. These and other objects and advantages of my improved construction will, however, hereinafter more fully appear.

In the accompanying drawings, I have shown for purposes of illustration, one embodiment which my invention may assume in practice.

In these drawings,—

Figure 1:
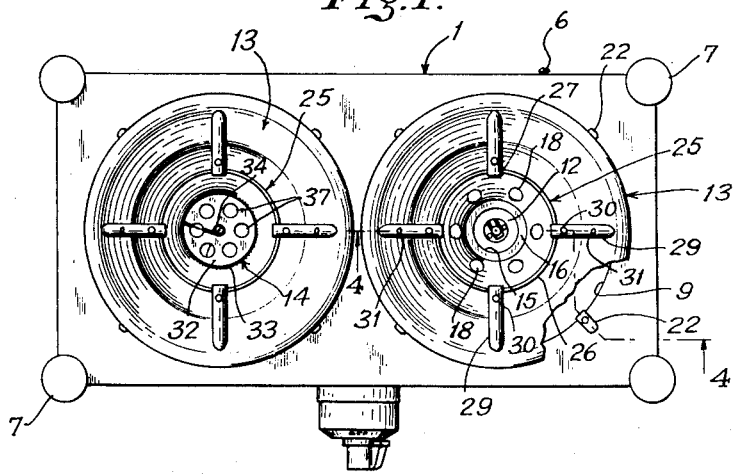
Figure 1 is a top plan view of a coffee maker stove of the multiple unit type constructed in accordance with this embodiment of my improvement, one of the heating units being removed and a portion of one of the reflecting bowls being broken away to facilitate illustration.
Figure 2:
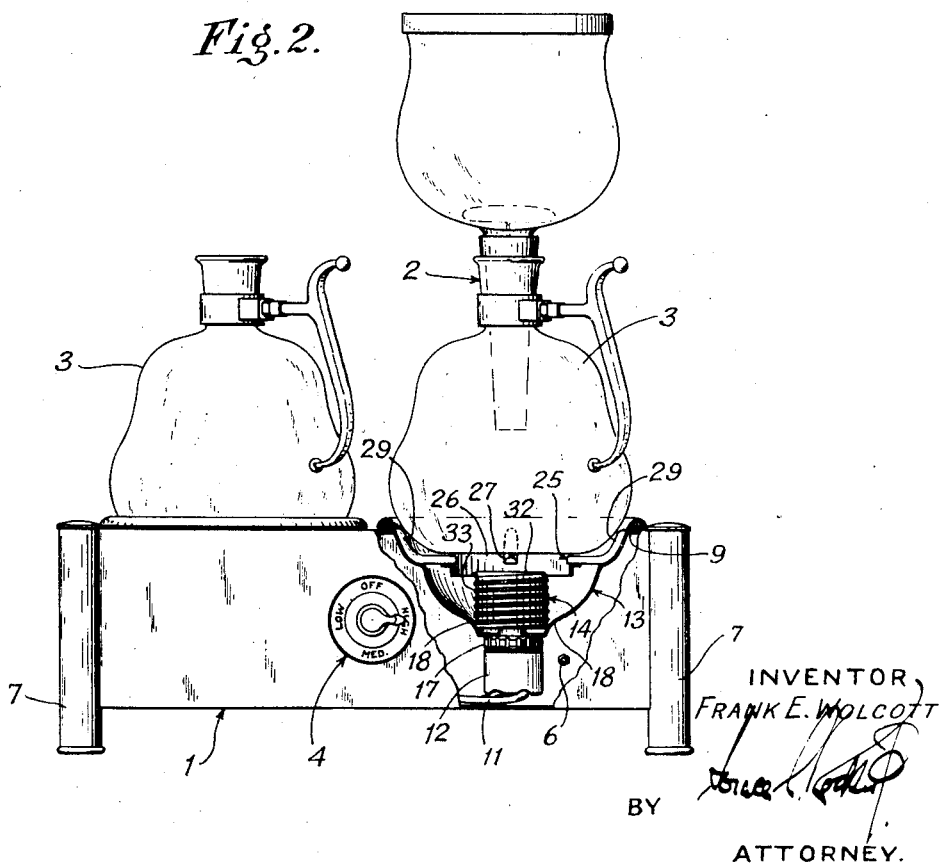
Figure 2 is a side elevation of the structure shown in Figure 1, a portion of the casing being broken away and the right hand device shown in longitudinal section to facilitate illustration, and this figure also showing a vacuum type coffee maker in position on this unit with which it cooperates, while the lower or dispensing bowl of such a coffee maker is shown in position on the other.
Figure 3:
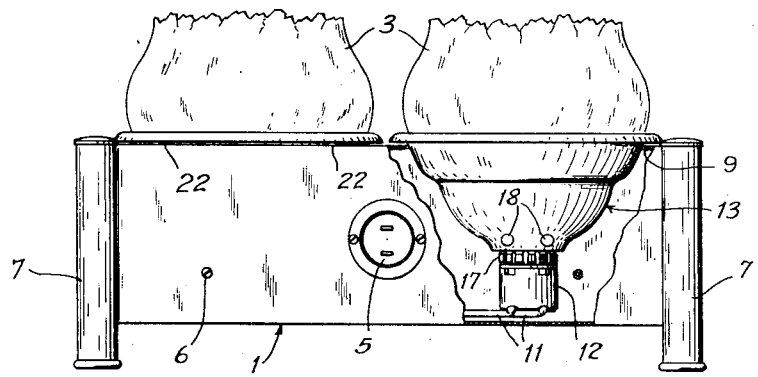
Figure 3 is a rear elevation of the device, with the casing broken away to show the reflector bowl and its connections in side elevation.
Figure 4:
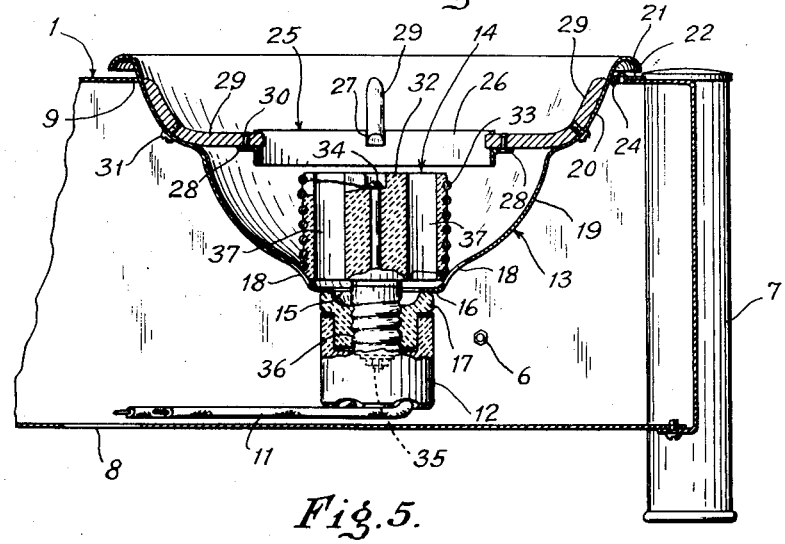
Figure 4 is an enlarged sectional view taken on line 4—4 of Figure 1.
Figure 5:
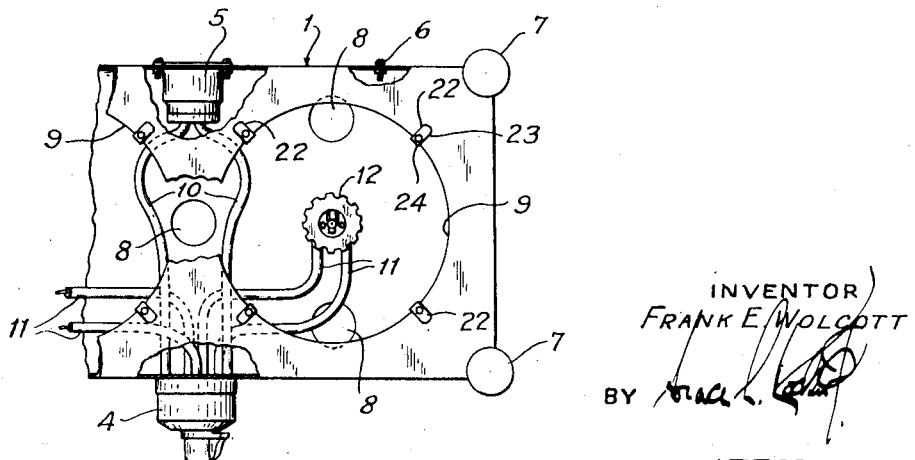

Figure 5 is a top plan view of a portion of the casing with the reflector bowls and heating unit removed to facilitate illustration In this illustrative construction, I have shown a device having a casing generally indicated at 1, and of the type adapted simultaneously to heat two devices, as, for example, vacuum type coffee makers such as generally indicated at 2, or the dispensing bowls thereof, indicated at 3, the same herein being seated in the top of the casing as illustrated and being supported and heated by improved supporting and heating means hereinafter described.

Referring first to the casing 1, it will be noted that the latter is herein provided with a suitable switch generally indicated at 4, adapted to control the current supply and herein located on the casing front between the two heating means, while a current connecting plug 5 is similarly located on the back of the device and a ground connection member 6 is also provided on the back. It will also be noted that the enclosing casing 1 is suitably supported on corner legs 7 spacing the body of the same from the supporting table or the like. This casing 1 is also hollow and provided with a series of air apertures 8 in its bottom to permit the circulation of air therethrough and through the two heating means carried therein. Herein, two of these apertures 8 are located below each of the heating devices, and one between the latter devices, although the arrangement and size of the apertures may be varied so long as they permit a free upward flow of air of considerable volume into the casing and around and through the heating means as hereinafter described. While it will be obvious that, if desired, a greater number of heating devices or a single heating device may be used, it will also be noted that herein the top of the casing 1 is provided with a pair of enlarged spaced apertures 9 adapted to receive the heating devices and permit the latter to be seated in the casing below the top thereof. It will also be observed that a pair of conductors 10 leads from the plug 5 to the switch 4 inside the casing, while pairs of conductors 11 lead from the switch each of which carries under an aperture 9 a usual threaded socket 12. Thus it will be evident that when heating devices, hereinafter described, are connected in these sockets 12, and the stove is connected to the line at the plug 5, current will be supplied to the heating devices, while the switch is capable of adjustment to control the current supply to both in any well known manner.

Referring more particularly to the heating devices carried in the apertures 9, it will be understood that herein each of the same is identical with the other so that a description of one will suffice for both. Moreover, it will be noted that each of these heating devices comprises a plurality of elements, one in the form of a combined reflector bowl and article supporting element 13 which is adapted to be supported at the top on the casing 1 and suspended in the latter, and the other in the form of a heating element 14 which is disposed axially in the bottom of the element 13 and adapted to be threaded through the latter into the socket 12 and thereby connect the elements 12, 13 and 14 together.

More particularly considering the reflector bowl, it will be noted that the latter is provided with an axial aperture 15 in the bottom thereof having a flange 16 surrounding the same and supportable on the usual rotatable and removable insulating ring 17 on the socket 12 in such manner as to be insulated effectually from the contact parts within the latter. It will also be noted that the bowl extends upwardly and outwardly from the flange relatively closely to the lower peripheral edge of the unit 14 and that it has its flange portion 16 spaced vertically from the bottom of the unit. As shown, it is also provided with a plurality of air apertures 18, herein six, disposed radially about this portion of the bowl and making possible a free flow of air into and through the latter and over and through the heating unit as hereinafter described. It will also be noted that from above these apertures 18, the surface of the reflector extends in parabolic form, as indicated at 19, to a point just above the upper end of the unit 14. There, the same is provided with an enlarged flange 20, also of general parabolic form, which extends out from the aperture 9 and has a curved back rim 21 disposed above the top of the casing 1. Here it will also be noted that this rim 21 is spaced from the casing 1 by radially disposed clips 22, herein attached at 23 to the top of the casing and also having depending portions 24 which serve to space the portion 20 from the edge of the aperture 9 and to provide air passage means outside and surrounding the portion 20 between these depending portions 24. Thus it will be noted that air circulation is permitted up through the inside and around the outside of the reflector bowl 13 and between the portion 20 thereof and the casing 1 while the rim 21 also has air passage means between it and the casing provided by the radially located members 22.

Attention is here also directed to the grid, generally indicated at 25, and herein forming a part of the reflector bowl 13 and being attached to the portion 20 thereof and disposed above the heating unit 14. Here it will be noted that this grid, herein in the form of a spider having radially disposed portions, is of non-heat absorbing and quick cooling construction and provides a minimum contact of metal with the bowl 3. As shown, it includes a thin vertically disposed metal ring 26 of greater diameter than and coaxial with the heating element 14 and spaced above the latter. This ring 26 provides a completely open article support and also provides such a support requiring only a minimum of contact of the support with the article to be heated, this being a feature of particular importance in heating glass bowls such as the lower or dispensing bowls 3 of coffee makers. Herein it will also be noted that this ring 26 is provided with radially located notches 27 in its upper edge formed by slitting the same vertically and bending outwardly wings 28. In these notches are also disposed the inner ends of supporting members 29, herein four, resting on the wings 28 and riveted thereto at 30, while the outer ends of the members 29 are inclined upwardly inside the portion 20 of the reflector bowl and terminate slightly below the top thereof. Herein it will also be noted that two of the four members 29 are suitably attached to the portion 20 by screws 31 accessible from the outer side of the bowl 13 and that all of them have a rounded upper surface minimizing possible contact with the bowl 3. As a result of the use of a small number of members 29 and of the use of such members of the construction described with the ring 26, it will be noted that a bowl support is provided which, while permitting the lower bowl 3 to be supported directly thereon, provides a bowl support not only compactly disposed within the bowl 13 but of a non-heat absorbing character especially adapted to cool quickly upon cutting off the heat to the electric heating means hereinafter described.

Referring more particularly to the heating element 14, it will be noted that the same comprises an insulating base 32 of cylindrical form and having a vertically arranged shallow spiral groove in its outer periphery providing a continuous seat for, and thereby preventing sagging of, a projecting resistance element 33, herein of the open coiled type. It will also be observed that one end of this element 33 is connected to an axially located screw 34 which is in turn connected to an end contact 35 engageable with a corresponding contact in the socket 12, while the lower end of the base 32 also carries a threaded contact shell 36 of smaller diameter than the base and connected to the other end of the resistance element 33 and threaded into the usual corresponding shell provided in the socket 12. Attention is also directed to the fact that a series of vertical air passages 37 of substantial diameter is provided in the base 32 extending from bottom to top thereof, six being provided herein, and disposed radially around the axis of the base in such manner as to permit a substantial flow of air from the apertures 18 in the reflector bowl 13 up through the heating unit both during heating and cooling as hereinafter more specifically described. Thus it will be evident that the heating unit 14 not only acts to connect the bowl 13 and socket 12 and support the latter when threaded into the same, but that the unit provides a heating means of large capacity disposed in effective spaced relation below the article supporting ring 26. Also, it will be noted that its passage means 37 are adapted to permit a flow of air up through the unit in such manner as to distribute the heat effectively upon the dispensing bowl 3 supported on the ring 26, while air from the apertures 18 also flows up outside the heating unit and through and around the coiled resistance element 33 thereon in such manner as to cause the heat developed thereby to be delivered effectually to the bowl 3, while effecting quick cooling of the resistance element and the insulating support therefor promptly following cessation of current flow.

In the operation of my improved construction, it will be evident that a very large amount of heat will be developed by the resistance element 33 despite the small size of the base 32. Some of this heat will rise directly, while other heat rays will be reflected by the parabolic surface of the reflector bowl 13 and directed by the latter in the direction of the bowl 3 on the ring 26. Moreover, it will be noted that instead of the rising heat passing into the atmosphere after passing out of the parabolic portion 19, the heat flowing laterally beneath the bottom of the bowl 3, while passing through passage means permitting free flow to the atmosphere, is directed by the portion 20 so that an enclosed stream of heated air is provided around the base of the bowl 3 to a substantial height above the bottom of the same in such manner as to utilize the heat most effectively. It will also be observed that the bowl 3, while supported on the ring 26 in such manner as to provide a minimum of objectionable metal contact with the glass, acts as a diverting and confining means for the upwardly flowing heat in such manner as to insure a flow of heat over the bottom of the bowl and the side portions thereof referred to. Attention is also directed to the fact that the air circulation means provided, including the air apertures 8 in the bottom of the casing 1 and the air apertures 18 and 37, insure a most effective circulation of the heat and a resultant maximum heat transfer to the bowl 3, while the air circulation passages provided between the members 22 act effectually to minimize objectionable heat transfer to the casing and consequent discoloration thereof.

Attention is also directed to the very quick cooling of the structure obtainable when the current supply is interrupted. This is especially important in electric vacuum type coffee makers to speed up the return of the coffee from the upper infusion bowl to the lower bowl while the coffee maker remains upon its stand, and in this construction is obtained automatically upon the completion of a normal infusion or brewing and while also obtaining the increased heat referred to above. More particularly, it will be observed that when the current supply is cut off, an induced air circulation of substantial volume is provided by the cooling heating element so that air not only flows through the apertures 18 but also flows through the apertures 37 in the base of the heating element. All of this cooling flow is effective, some cooling the bowl 13 and heating element by passing through the coils thereof and over the inside of the base 32 carrying these coils, while some passes through the base and cools it from the inside. The air is also directed over the surface of the quick cooling spider, comprising the ring 26 and radial members 29, and over the bottom surface of the bowl 3 and the sides of the latter as well as the inside surface of the portion 20 between the members 29, while the flow of air outside the reflector bowl 13 and passing between the members 22, further acts to cool the outside of the bowl 13. Thus it will be observed that, with these air flows acting upon the quick cooling structures heretofore described, a very quick cooling is obtained.

As a result of my improved construction, it is made possible to eliminate the spaced upstanding bowl supporting arms heretofore provided in coffee makers of the quick cooling type, and yet to continue to obtain the desired quick cooling effect despite the new enclosed compact nesting of the parts, the seating of the lower bowl closely adjacent the heating element, and use of heating means of higher heating capacity. It will also be noted that a very compact construction is provided and one wherein the dispensing bowl is centered and positioned in such manner as not to be readily displaceable as in an ordinary flat surfaced stove, while also directing the heat and cooling air effectively upon the bowl and providing for the desired free communication with the atmosphere. Moreover, it will be observed that the stove parts are readily separable when necessary by simply unscrewing the heating element 14, the reflector bowl 13 then being capable of being lifted out to permit cleaning or access to the socket 12 or the conductors within the casing. Attention is also directed to the fact that the structure is such as to enable the device to be very inexpensively manufactured and have an attractive appearance, all of the mechanism being housed in the casing. These and other advantages of my improved construction will, however, be clearly apparent to those skilled in the art.

While I have in this application specifically described one embodiment which my invention may assume in practice, it will be understood that the same has been shown for illustrative purposes, and that the invention may be modified and embodied in various other forms without departing from its spirit or the scope of the appended claims.

What I claim as new and desire to secure by Letters Patent is:—

1. In an electric coffee maker stove, quick cooling bowl heating and supporting means presenting a resistance element and an article support above said element, and a bowl housing said element and said support therein.

2. In an electric coffee maker stove, a reflector bowl, and quick cooling bowl heating and supporting means presenting an article support in said bowl between the bottom and top thereof, and a resistance element housed in said bowl and spaced above said reflector and below the supporting surface of said support.

3. In a quick cooling coffee maker stove, a bowl, and quick cooling bowl supporting and electric heating means in said bowl comprising a quick cooling bowl supporting grid supported in said bowl above the bottom thereof, and a resistance element also supported in said bowl and spaced below the top surface of said grid.

4. In an electric coffee maker stove, a combined reflector bowl and article support having a parabolic surface and an enlarged reflector rim forming a continuation thereof and carrying an article support between its ends and below said rim, and a resistance element disposed coaxially of said parabolic surface and below said support.

5. In an electric coffee maker stove, a reflector bowl having a body portion and an enlarged parabolic rim forming a continuation thereof, a resistance element co-operating with said bowl and disposed within the body of said bowl, and an article support above said resistance element and on said rim adjacent the bottom thereof.

6. In a quick cooling coffee maker stove, a reflector bowl, and quick cooling electric heater carrying and quick cooling coffee maker supporting means both disposed within the vertical limits of said bowl and vertically spaced out of contact with one another.

7. In an electric coffee maker stove, a bowl, and quick cooling electric heating means and quick cooling article supporting means both housed in said bowl and both exposed to the atmosphere and adapted to cool quickly while a previously heated article is still supported on said supporting means.

8. In an electric coffee maker stove, a bowl, quick cooling electric heating means and quick cooling article supporting means both housed in said bowl and both exposed to the atmosphere, and means cooperating with said heating and supporting means for inducing a cooling draft through said bowl and said means upon cessation of current flow and while a previously heated article remains on said supporting means.

9. In an electric coffee maker stove, a bowl, quick cooling bowl heating and supporting means presenting a resistance element housed in said bowl and a quick cooling article support likewise housed in said bowl and having its supporting surface above said resistance element, and means for supplying a cooling air flow through said bowl, element and support on cessation of current flow while an article is on said support.

10. In an electric coffee maker stove, a bowl, quick cooling bowl heating and supporting means in said bowl presenting quick cooling heating means housed therein and a quick cooling article support housed therein, and means for effecting an upward flow of air through and around said heating means and said article support.

11. In an electric coffee maker stove, a bowl having air passage means in the bottom thereof, and quick cooling electric heating means and quick cooling article supporting means housed in said bowl likewise having air passage means therethrough for distributing through said bowl and said heating and supporting means while a previously heated article remains on said supporting means, a cooling flow induced upon cessation of current flow.

12. In an electric heating device, a stand having a support thereon, a bowl seated in said support, electric resistance means in said bowl, quick cooling article supporting means above said resistance means and likewise in said bowl, and means for providing air circulation both through said bowl and around the latter between the same and said support.

13. In an electric coffee maker stove, a stand having a support thereon, a bowl seated in said support, quick cooling electric heating and article supporting means in said bowl, both substantially below the top thereof, and means for providing air circulation both through the bowl and around the latter between the same and said support, and through and around said heating means, and through said article supporting means.

14. In an electric heating device, a stand having an aperture therein, a bowl seated in said aperture and having air passage means in its bottom, electric heating means in said bowl having air passage means therethrough, article supporting means in said bowl also having such passages, and means for providing air circulation between said bowl and stand.

15. In an electric heating device, an enclosing casing having air inlet means in its base and a bowl aperture in its top, spacing means in said bowl aperture providing air circulating means, a bowl in said aperture spaced therefrom by said means, heating means in said bowl, and air circulating aperture means in said bowl receiving air from said inlet means and delivering the same through the bowl.

16. In an electric heating device, an enclosing casing having aperture means in its base and a bowl aperture in its top, spacing means in said bowl aperture providing air circulating means therethrough, a bowl in said aperture spaced by said means, electric heating means in said bowl, and an article support in said bowl above said heating means.

17. In an electric heating device, an enclosing casing having aperture means in its base and a bowl aperture in its top, radially located spacing means in said bowl aperture, a bowl in said aperture spaced by said means and having apertures in its bottom, electric heating means in said bowl having air passage means communicating with said last mentioned apertures, and article supporting means in said bowl above said heating means also providing air passage means.

18. In an electric heating device, a threaded socket, a reflector bowl above said socket having air aperture means therein, and a heating unit threaded in said socket and disposed in said bowl having a resistance element on its exterior above said aperture means and also having air passage means inside said unit and communicating with said air aperture means providing an independent internal air flow through said unit.

19. In an electric heating device, an article support, electric heating means below the same; a bowl housing said heating means and also enclosing said support and the base of an article on said support, and air circulation means for providing air flow into said bowl, over said heating means, and through said article supporting means to an article supported thereon.

20. In an electric heating device, an article support, electric heating means below the same, a reflector bowl housing said heating means and also enclosing said support and the base of an article on said support, air circulation means for providing air flow while an article is on said support into said bowl, over and through said heating means, through said article supporting means to an article supported thereon, and out between the top of said bowl and said article, a support for said bowl, and means for providing air circulation between the latter and said support.

21. In an electric coffee maker stove, a casing having an aperture in its top, a bowl in said aperture having an external flange overlying the periphery of said aperture, heating means in said bowl, and spaced spacing means below said flange and projecting over said aperture and spacing said bowl from the periphery of said aperture to provide air insulation therebetween.

22. In an electric coffee maker stove, a casing having an aperture in its top, a bowl in said aperture also having an open top, quick cooling means for supporting a coffee maker bowl over the top of said bowl, electric resistance means supported in said bowl below the supporting surface of said bowl supporting means, and air circulating means comprising passage forming means in said casing and bowl for effecting air flow inside the latter around said resistance means to a bowl supported on said supporting means, and cooperating air flow means for effecting air flow through said aperture forming means and in said casing up around the exterior of said bowl and between the latter and said casing.

23. In an electric coffee maker stove, a casing having an aperture in its top and a spaced apertured bottom, a bowl supported in the aperture in the top and also having apertures in its bottom, and quick cooling resistance means and bowl supporting means disposed in said bowl below the top thereof with said resistance means below said bowl supporting means, said resistance and bowl supporting means each having air circulating passage means therethrough communicating freely with the apertures in the bowl and casing bottom.

24. In a coffee maker, a bowl, coffee maker heating and supporting means within said bowl presenting a coffee maker support within the latter and electric resistance means below the top of said support, a vacuum type coffee maker comprising interconnected lower water and upper coffee bowls having the water bowl seated on said support and heated by said resistance means to infuse coffee in said coffee bowl with water in said water bowl, and means operative upon cessation of current flow and while said water bowl is supported on said support for automatically returning the brewed coffee in said coffee bowl to said water bowl upon the completion of a normal infusion.

25. In a coffee maker, a bowl, quick cooling coffee maker heating and supporting means within said bowl presenting a coffee maker support within the latter and electric resistance means below the top of said support, a vacuum type coffee maker comprising interconnected lower water and upper coffee bowls having the water bowl seated on said support and heated by said resistance means to infuse coffee in said coffee bowl with water in said water bowl, and means operative upon cessation of current flow while said water bowl is supported on said support and including air flow delivery means cooperating with said quick cooling means and delivering over the same and on said water bowl, for automatically returning the brewed coffee in said coffee bowl to said water bowl upon the completion of a normal infusion.

26. In a coffee maker, a bowl, coffee maker heating and supporting means within said bowl presenting a coffee maker support within the latter and electric resistance means below the top of said support, a vacuum type coffee maker comprising interconnected lower water and upper coffee bowls having the water bowl seated on said support and heated by said resistance means to infuse coffee in said coffee bowl with water in said water bowl, and means operative upon cessation of current flow while said water bowl is supported on said support for automatically returning the brewed coffee in said coffee bowl to said water bowl upon the completion of a normal infusion, said coffee maker support comprising a quick cooling grid in contact with the bottom of said water bowl presenting passage forming means for lateral air flow beneath the latter, and said first mentioned bowl having an upwardly directed rim extending above said grid surface and of substantially larger diameter than the bottom of said water bowl providing communicating peripheral air escape means up along said water bowl.

27. In a quick cooling coffee maker stove, a bowl, quick cooling coffee maker bowl supporting and heating means therein including a quick cooling grid in said bowl and quick cooling electric resistance means in said bowl below the top surface of said grid, and an upwardly projecting flange on said bowl projecting above said top surface and providing constantly open peripheral air escape means from said grid when substantially the entire area of the latter is covered by the bottom of a coffee maker water bowl.

28. In a quick cooling coffee maker stove, a bowl, quick cooling coffee maker bowl supporting and heating means therein including a quick cooling grid in said bowl and quick cooling electric resistance means in said bowl below the top surface of said grid, an upwardly projecting flange on said bowl projecting above said top surface and providing constantly open peripheral air escape means from said grid when substantially the entire area of the latter is covered by the bottom of a coffee maker water bowl, and means within said flange for preventing the insertion of a water bowl on said grid of sufficient diameter to close said air escape means.

FRANK E. WOLCOTT.